United States Patent
Jones, II

(10) Patent No.: US 12,294,162 B1
(45) Date of Patent: May 6, 2025

(54) PASSIVE LOOP ANTENNA ASSEMBLY

(71) Applicant: Kenneth Bethune Jones, II, Phoenix, AZ (US)

(72) Inventor: Kenneth Bethune Jones, II, Phoenix, AZ (US)

(*) Notice: Subject to any disclaimer, the term of this patent is extended or adjusted under 35 U.S.C. 154(b) by 0 days.

(21) Appl. No.: 17/671,342

(22) Filed: Feb. 14, 2022

(51) Int. Cl.
    *H01Q 7/00*     (2006.01)
    *G01V 3/12*     (2006.01)
    *H01P 3/12*     (2006.01)

(52) U.S. Cl.
    CPC ............... *H01Q 7/00* (2013.01); *G01V 3/12* (2013.01); *H01P 3/12* (2013.01)

(58) Field of Classification Search
    CPC .............. H01P 3/12; H01Q 1/36; G01V 3/083
    See application file for complete search history.

(56) References Cited

U.S. PATENT DOCUMENTS

| | | | | |
|---|---|---|---|---|
| 2,187,588 | A * | 1/1940 | Leib | G01S 1/02 342/420 |
| 5,066,917 | A * | 11/1991 | Stolarczyk | G01V 13/00 324/334 |
| 9,685,826 | B1 * | 6/2017 | Bhatti | H02J 50/90 |
| 9,742,058 | B1 * | 8/2017 | O'Neill, Jr. | H01Q 1/08 |
| 10,495,719 | B1 * | 12/2019 | Uzes | G01S 3/043 |
| 2017/0200436 | A1 * | 7/2017 | Di Cicco | G10D 13/02 |
| 2021/0263090 | A1 * | 8/2021 | Everroad | G01R 33/0023 |

* cited by examiner

Primary Examiner — Huy Q Phan
Assistant Examiner — Temilade S Rhodes-Vivour
(74) *Attorney, Agent, or Firm* — Plager Schack LLP; Mark H. Plager; Michael O'Brien

(57) ABSTRACT

A passive loop antenna assembly is configured to detect distant rock fractures. The loop antenna assembly has a loop antenna spun around an enclosure ring. An enclosure is arranged around the enclosure ring and further has an opening portion exposing a portion of the loop antenna. A wave guide assembly is arranged over the loop antenna and has amplifier circuitry that is wired to two leads from the loop antenna. A support structure is joined to the enclosure, the wave guide, and a turntable. A base is joined to the turntable and further has roller guides, roller bearings, and base feet.

19 Claims, 4 Drawing Sheets

PASSIVE LOOP ANTENNA ASSEMBLY

BACKGROUND

The embodiments herein relate generally to antennas.

Prior to embodiments of the disclosed invention passive loop antennas were unable to find a number of objects. Embodiments of the disclosed invention solve these problems.

SUMMARY

A passive loop antenna assembly is configured to detect distant rock fractures. The loop antenna assembly has a loop antenna spun around an enclosure ring. An enclosure is arranged around the enclosure ring and further has an opening portion exposing a portion of the loop antenna. A wave guide assembly is arranged over the loop antenna and has amplifier circuitry that is wired to two leads from the loop antenna. A support structure is joined to the enclosure, the wave guide, and a turntable. A base is joined to the turntable and further has roller guides, roller bearings, and base feet.

The loop antenna can be attached to the enclosure ring with a guide wire. The loop antenna can have a winds per layer to layers ratio of at least ten to one. A subassembly of the loop antenna including the enclosure and the enclosure ring are painted with a thick graphite impregnated paint.

Two side panels are joined with a top panel, a bottom panel, and further comprising panel guides configured to attenuate radio waves. The two side panels, the top panel, and the bottom panel have an outer surface plated with a thick graphite impregnated paint such that the painted surfaces of the two side panels, the top panel, and the bottom panel do not touch one another but do touch the panel guides.

A tube houses the two leads and further comprising an outer surface plated with a thick graphite impregnated paint. The roller bearings can be glass marbles.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
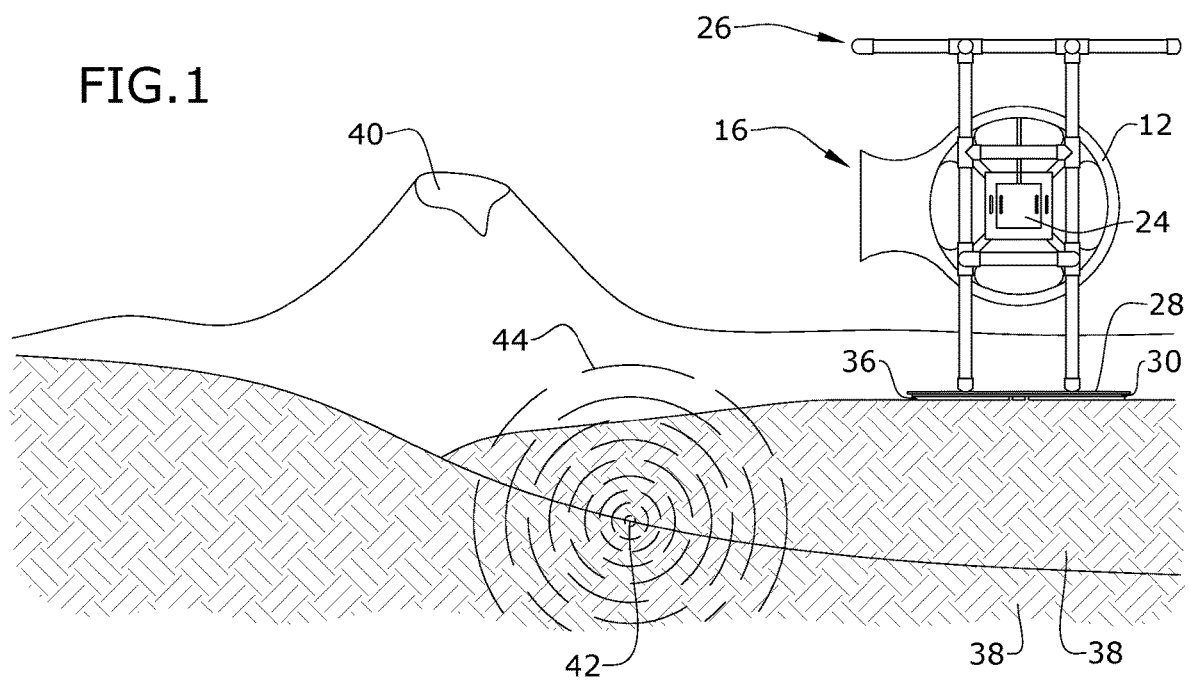
FIG. 1 shows a side view of one embodiment of the present invention shown in use.
Figure 2:
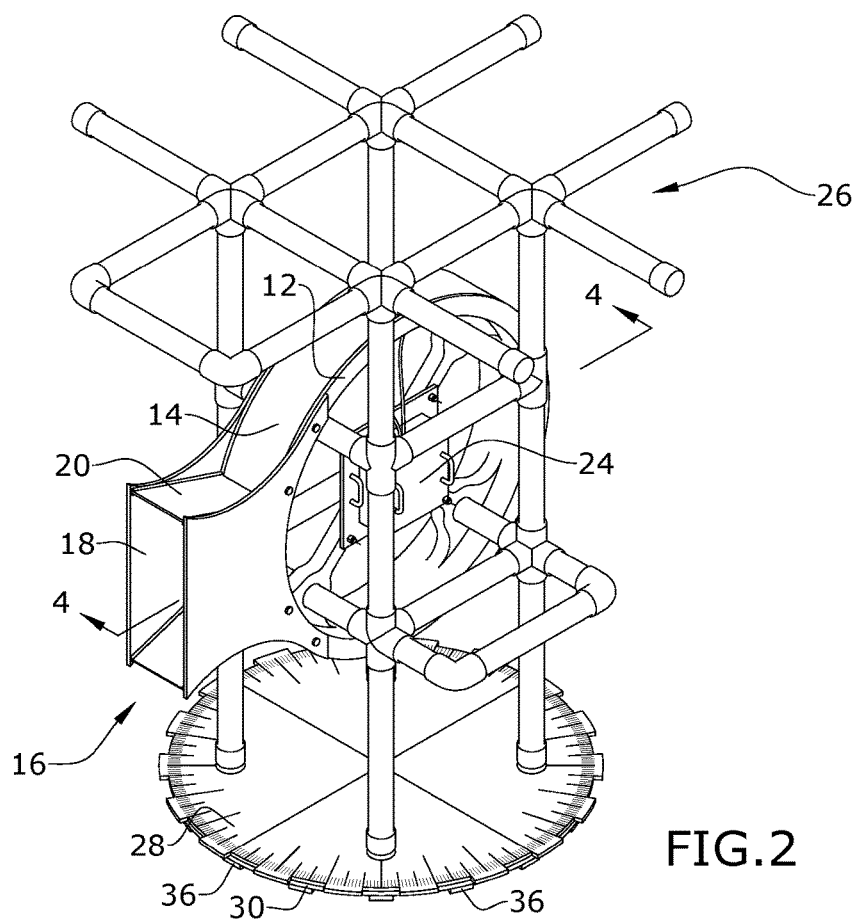
FIG. 2 shows a perspective view of one embodiment of the present invention.
Figure 3:
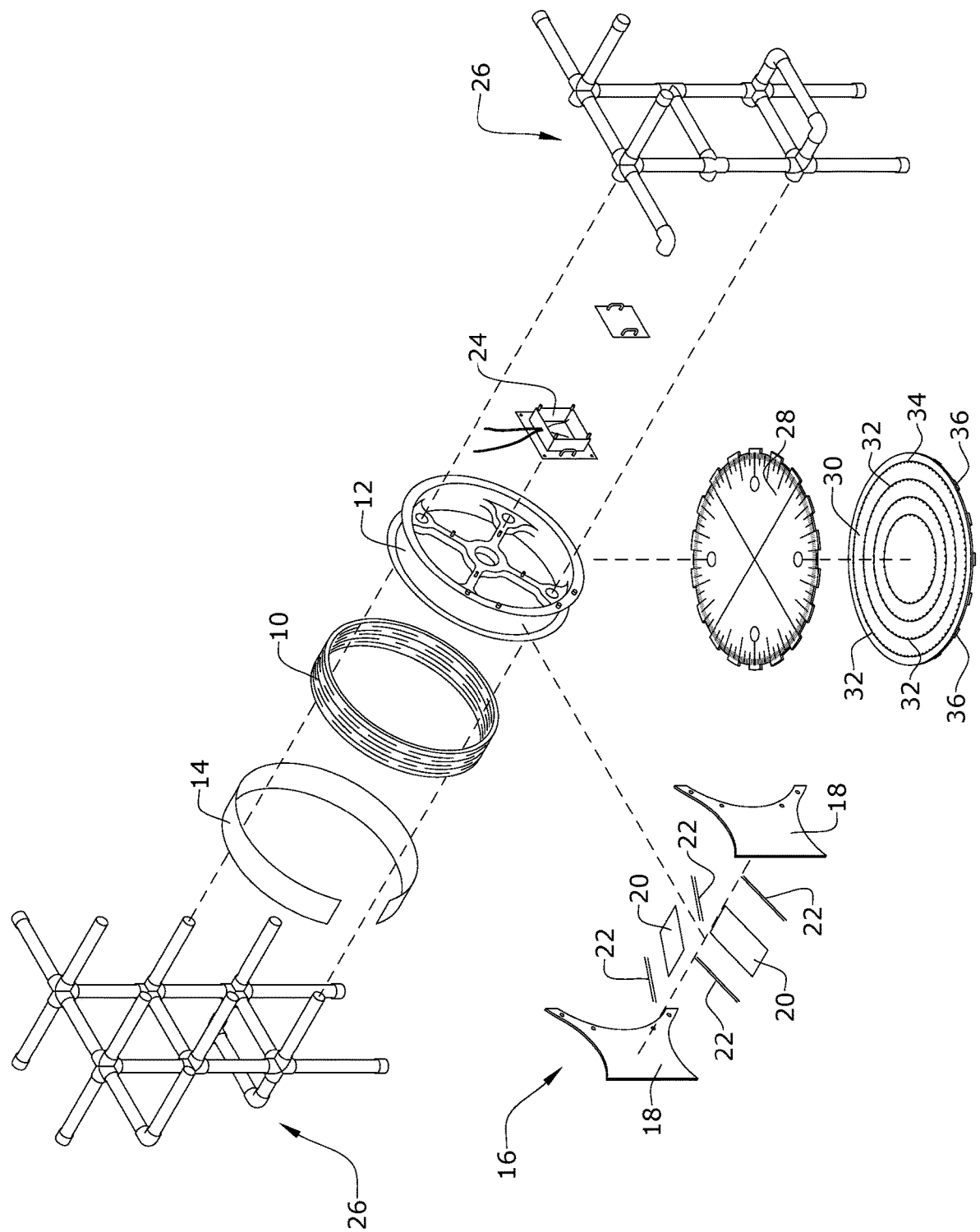
FIG. 3 shows an assembly view of one embodiment of the present invention.
Figure 4:
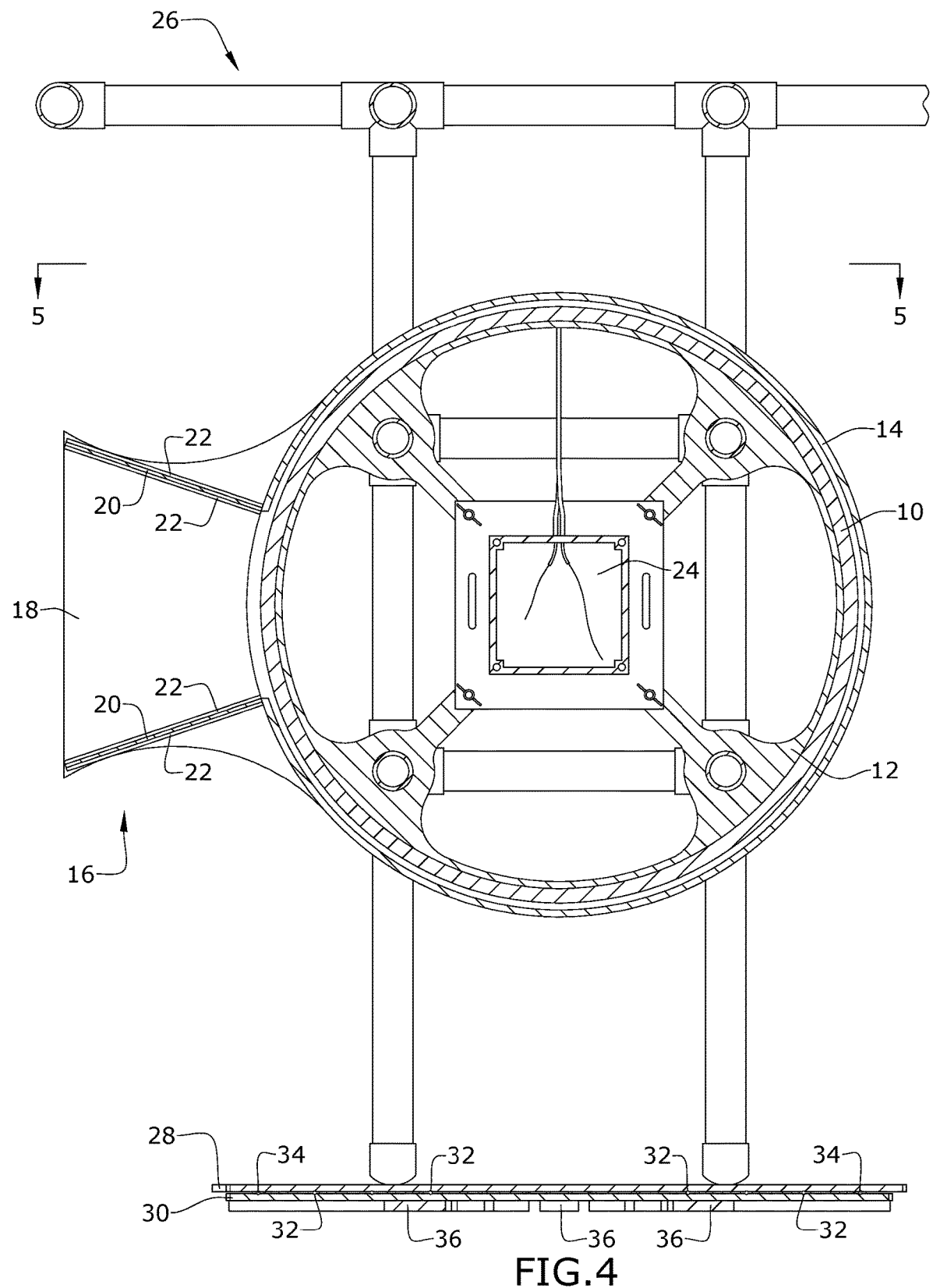
FIG. 4 shows a section view of one embodiment of the present invention taken along line 4-4 in FIG. 2.
Figure 5:
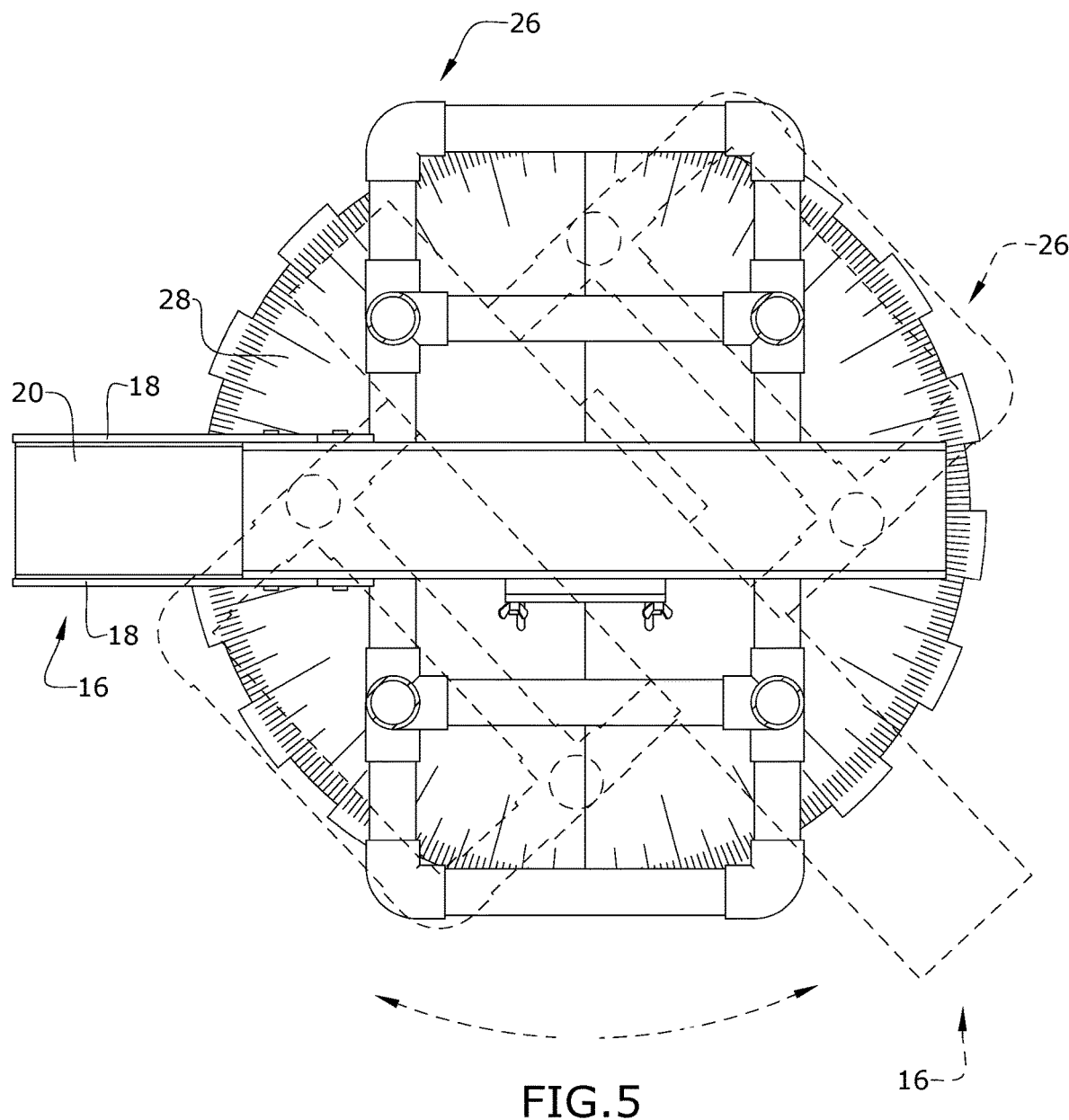
FIG. 5 shows a top view of one embodiment of the present invention with portions of the support structure in dashed lines for clarity.

By way of example, and referring to FIG. 1, one embodiment of a passive loop antenna assembly is configured to detect distant rock fractures. The loop antenna assembly has a loop antenna 10 that is spun around an enclosure ring 12. An enclosure 14 is arranged around the enclosure ring 12 and further has an opening portion exposing a portion of the loop antenna 10. A wave guide assembly 16 is arranged over the loop antenna 10 and has amplifier circuitry 24 that is wired to two leads from the loop antenna 10. A support structure 26 is joined to the enclosure 14, the wave guide assembly 16, and a turntable 28. A base 30 is joined to the turntable 28 and further has roller guides32, roller bearings 34, and base feet 36.

The loop antenna 10 can be attached to the enclosure ring 12 with a guide wire. The loop antenna 10 can have a winds per layer to layers ratio of at least ten to one. A subassembly of the loop antenna 10 can include the enclosure 14 and the enclosure ring 12 that are painted with a thick graphite impregnated paint.

Two side panels 18 are joined with a top panel 20, a bottom panel 20, and further connected to panel guides 22 configured to attenuate radio waves. The two side panels 18, the top panel 20, and the bottom panel 20 have an outer surface plated with a thick graphite impregnated paint such that the painted surfaces of the two side panels 22, the top panel 20, and the bottom panel 20 do not touch one another but do touch the panel guides 22.

A tube houses the two leads and further comprising an outer surface plated with a thick graphite impregnated paint. The roller bearings 34 can be glass marbles.

The base feet 36 rest on ground surface which rests upon tectonic plates 38. Movement of tectonic plates against one another induces stress at an epicenter 42 before fracture causing radio waves 44. Radio waves 44 are proximate volcano 40 and the passive loop antenna assembly.

As radio waves 44 travel into the wave guide assembly 16 into the loop antenna 10 which is picked up by the electronic circuitry 24. However, radio waves 44 that do not pass into the wave guide assembly 16 are attenuated and will not be detected.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, 16.

In particular, any use of "step of" in the claims is not intended to invoke the provision of 35 U.S.C. § 112, 16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A passive loop antenna assembly, configured to detect distant rock fractures; the loop antenna assembly comprising:
    a loop antenna, spun around an enclosure ring;
    an enclosure, arranged around the enclosure ring and further comprising an opening portion exposing a portion of the loop antenna;
    a wave guide assembly, arranged over the loop antenna further comprising amplifier circuitry, wired to two leads from the loop antenna;
    a support structure, joined to the enclosure, the wave guide, and a turntable;
    a base, joined to the turntable and further comprising roller guides, roller bearings, and base feet;
    wherein a subassembly of the loop antenna, enclosure and enclosure ring are painted with a thick graphite impregnated paint.

2. The passive loop antenna assembly of claim 1, wherein the loop antenna is attached to the enclosure ring with a guide wire.

3. The passive loop antenna assembly of claim 1, wherein the loop antenna having a winds per layer to layers ratio of at least ten to one.

4. The passive loop antenna assembly of claim 1, further comprising: two side panels, joined with a top panel, a bottom panel, and further comprising panel guides configured to attenuate radio waves.

5. The passive loop antenna assembly of claim 4, wherein the two side panels, the top panel, and the bottom panel have an outer surface plated with a thick graphite impregnated paint such that the painted surfaces of the two side panels, the top panel, and the bottom panel do not touch one another but do touch the panel guides.

6. The passive loop antenna assembly of claim 1, further comprising a tube housing the two leads and further comprising an outer surface plated with a thick graphite impregnated paint.

7. The passive loop antenna assembly of claim 1, wherein the roller bearings are glass marbles.

8. A passive loop antenna assembly, configured to detect distant rock fractures; the loop antenna assembly comprising:
    a loop antenna, spun around an enclosure ring;
    an enclosure, arranged around the enclosure ring and further comprising an opening portion exposing a portion of the loop antenna;
    a wave guide assembly, arranged over the loop antenna further comprising amplifier circuitry, wired to two leads from the loop antenna;
    a support structure, joined to the enclosure, the wave guide, and a turntable;
    a base, joined to the turntable and further comprising roller guides, roller bearings, and base feet;
    two side panels, joined with a top panel, a bottom panel, and further comprising panel guides configured to attenuate radio waves;
    wherein the two side panels, the top panel, and the bottom panel have an outer surface plated with a thick graphite impregnated paint such that the painted surfaces of the two side panels, the top panel, and the bottom panel do not touch one another but do touch the panel guides.

9. The passive loop antenna assembly of claim 8, wherein the loop antenna is attached to the enclosure ring with a guide wire.

10. The passive loop antenna assembly of claim 8, wherein the loop antenna having a winds per layer to layers ratio of at least ten to one.

11. The passive loop antenna assembly of claim 8, wherein a subassembly of the loop antenna, enclosure and enclosure ring are painted with a thick graphite impregnated paint.

12. The passive loop antenna assembly of claim 8, further comprising a tube housing the two leads and further comprising an outer surface plated with a thick graphite impregnated paint.

13. The passive loop antenna assembly of claim 8, wherein the roller bearings are glass marbles.

14. A passive loop antenna assembly, configured to detect distant rock fractures; the loop antenna assembly comprising:
    a loop antenna, spun around an enclosure ring;
    an enclosure, arranged around the enclosure ring and further comprising an opening portion exposing a portion of the loop antenna;
    a wave guide assembly, arranged over the loop antenna further comprising amplifier circuitry, wired to two leads from the loop antenna;
    a support structure, joined to the enclosure, the wave guide, and a turntable;
    a base, joined to the turntable and further comprising roller guides, roller bearings, and base feet; and
    a tube housing the two leads and further comprising an outer surface plated with a thick graphite impregnated paint.

15. The passive loop antenna assembly of claim 14, wherein the loop antenna is attached to the enclosure ring with a guide wire.

16. The passive loop antenna assembly of claim 14, wherein the loop antenna having a winds per layer to layers ratio of at least ten to one.

17. The passive loop antenna assembly of claim 14, further comprising: two side panels, joined with a top panel, a bottom panel, and further comprising panel guides configured to attenuate radio waves.

18. The passive loop antenna assembly of claim 17, wherein the two side panels, the top panel, and the bottom panel have an outer surface plated with a thick graphite impregnated paint such that the painted surfaces of the two side panels, the top panel, and the bottom panel do not touch one another but do touch the panel guides.

19. The passive loop antenna assembly of claim 14, further comprising a tube housing the two leads and further comprising an outer surface plated with a thick graphite impregnated paint.

* * * * *